(12) United States Patent
Melni

(10) Patent No.: US 11,306,855 B2
(45) Date of Patent: Apr. 19, 2022

(54) FLUID CONDUIT CONNECTOR

(71) Applicant: MELNI, LLC, Twin Falls, ID (US)

(72) Inventor: Mark L. Melni, Twin Falls, ID (US)

(*) Notice: Subject to any disclaimer, the term of this patent is extended or adjusted under 35 U.S.C. 154(b) by 227 days.

(21) Appl. No.: 16/660,764

(22) Filed: Oct. 22, 2019

(65) Prior Publication Data

US 2020/0224807 A1    Jul. 16, 2020

Related U.S. Application Data

(60) Provisional application No. 62/749,140, filed on Oct. 23, 2018.

(51) Int. Cl.
| | | |
|---|---|---|
| *F16L 33/00* | (2006.01) | |
| *F16L 37/10* | (2006.01) | |
| *F16L 21/08* | (2006.01) | |
| *F16L 37/127* | (2006.01) | |
| *F16L 25/12* | (2006.01) | |

(52) U.S. Cl.
CPC ............ *F16L 37/101* (2013.01); *F16L 21/08* (2013.01); *F16L 37/127* (2013.01); *F16L 25/12* (2013.01)

(58) Field of Classification Search
CPC ....... F16L 21/08; F16L 21/002; F16L 21/005; F16L 37/12; F16L 37/127; F16L 37/133; F16L 37/101; F16L 25/12; F16L 25/06; F16L 33/2071; F16L 33/2073; F16L 33/2075; F16L 33/2078; F16L 33/228
USPC .......................... 285/89, 238, 239, 307, 417
See application file for complete search history.

(56) References Cited

U.S. PATENT DOCUMENTS

| | | | | | |
|---|---|---|---|---|---|
| 2,665,931 | A | * | 1/1954 | Vegren | F16B 37/12 403/355 |
| 3,144,262 | A | * | 8/1964 | Reynolds | F16L 37/12 285/311 |
| 4,376,525 | A | * | 3/1983 | Fremy | F16L 37/22 251/149.6 |
| 5,181,750 | A | * | 1/1993 | Reum | F16L 33/30 285/115 |
| 5,286,068 | A | * | 2/1994 | Wiebe | F16L 33/24 285/114 |
| 5,758,909 | A | * | 6/1998 | Dole | F16L 37/12 285/305 |
| 6,435,564 | B1 | * | 8/2002 | Hohmann | F16L 35/00 285/115 |
| 6,779,269 | B2 | * | 8/2004 | Green | F16L 35/00 285/114 |

(Continued)

*Primary Examiner* — Aaron M Dunwoody
(74) *Attorney, Agent, or Firm* — Pedersen and Company, PLLC; Ken J. Pedersen; Barbara S. Pedersen

(57) ABSTRACT

A connector includes one or more spirals securing a fluid conduit to the connector for fluid communication with another hollow object such as another fluid conduit. The spiral(s) press/compress and seal the conduit around an outer circumference of an end of rigid, hollow insert of the connector. Another portion of the connector may include spiral(s) that press/compress and seal a second conduit around a second end of the insert, or may include a hose-coupler that connects to a second conduit. Thus, two fluid conduits may be fluid-sealed to an inner-passageway of the insert, by tightened spiral(s) or by tightened spiral(s) and coupler combination, so the conduits are in fluid communication with each other. The spiral(s) may be retained in, and released from, the tightened condition, by a ratchet-based latching and unlatching system.

22 Claims, 11 Drawing Sheets

(56) References Cited

U.S. PATENT DOCUMENTS

| | | |
|---|---|---|
| 7,794,255 B2 | 9/2010 | Melni |
| 7,901,233 B2 | 3/2011 | Melni |
| 8,066,525 B2 | 11/2011 | Melni |
| 8,246,370 B2 | 8/2012 | Melni |
| 8,771,000 B2 | 7/2014 | Melni |
| 9,608,346 B2 | 3/2017 | Melni |
| 9,614,304 B2 | 4/2017 | Melni |
| 10,801,144 B2 * | 10/2020 | Tseng ................. D05B 69/08 |
| 2003/0088965 A1 * | 5/2003 | Green .................. F16L 33/228 29/520 |
| 2012/0169042 A1 * | 7/2012 | Flynn .................... F16L 33/22 285/239 |
| 2020/0063903 A1 * | 2/2020 | Chernov ............ F16L 37/0847 |

* cited by examiner

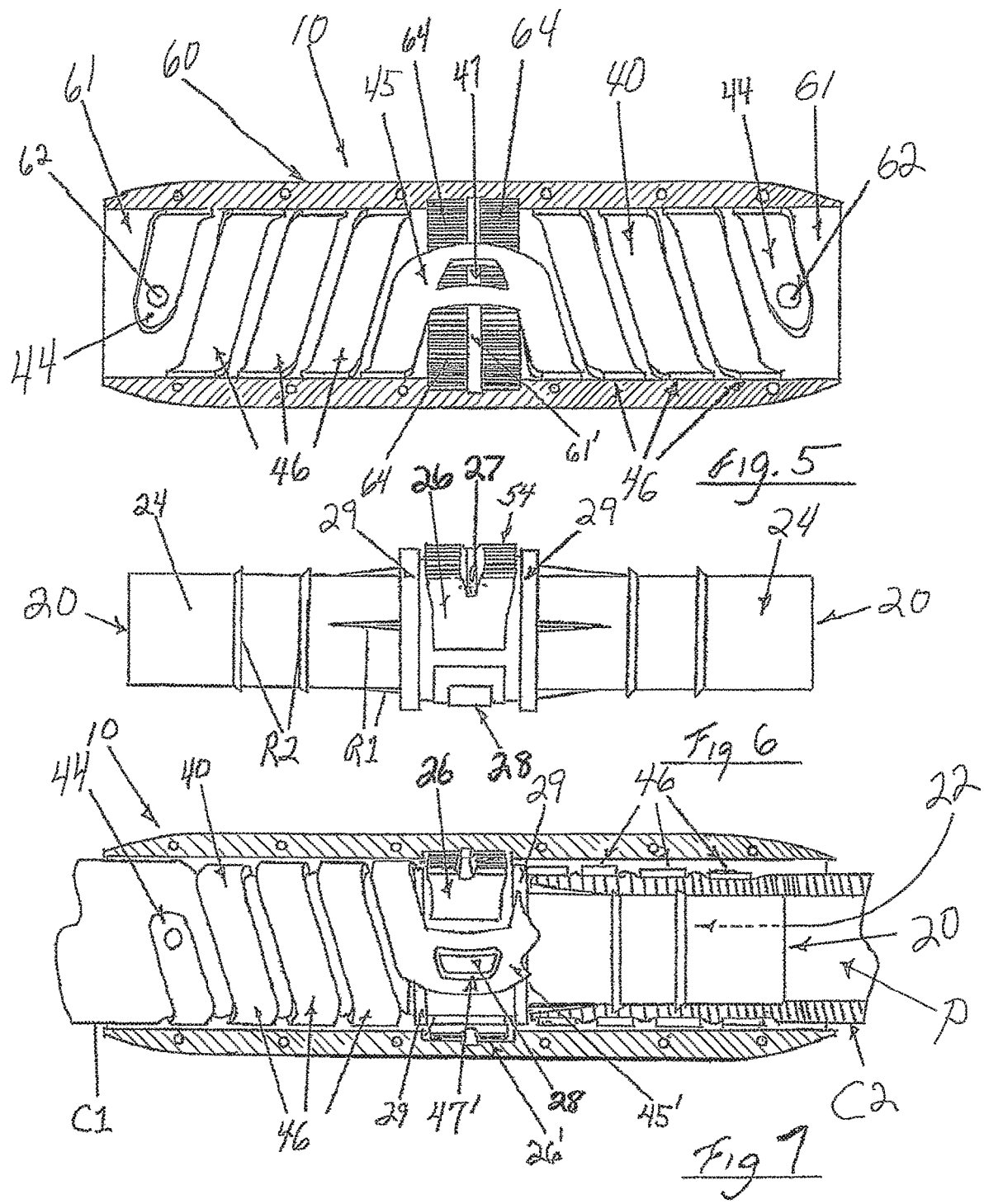

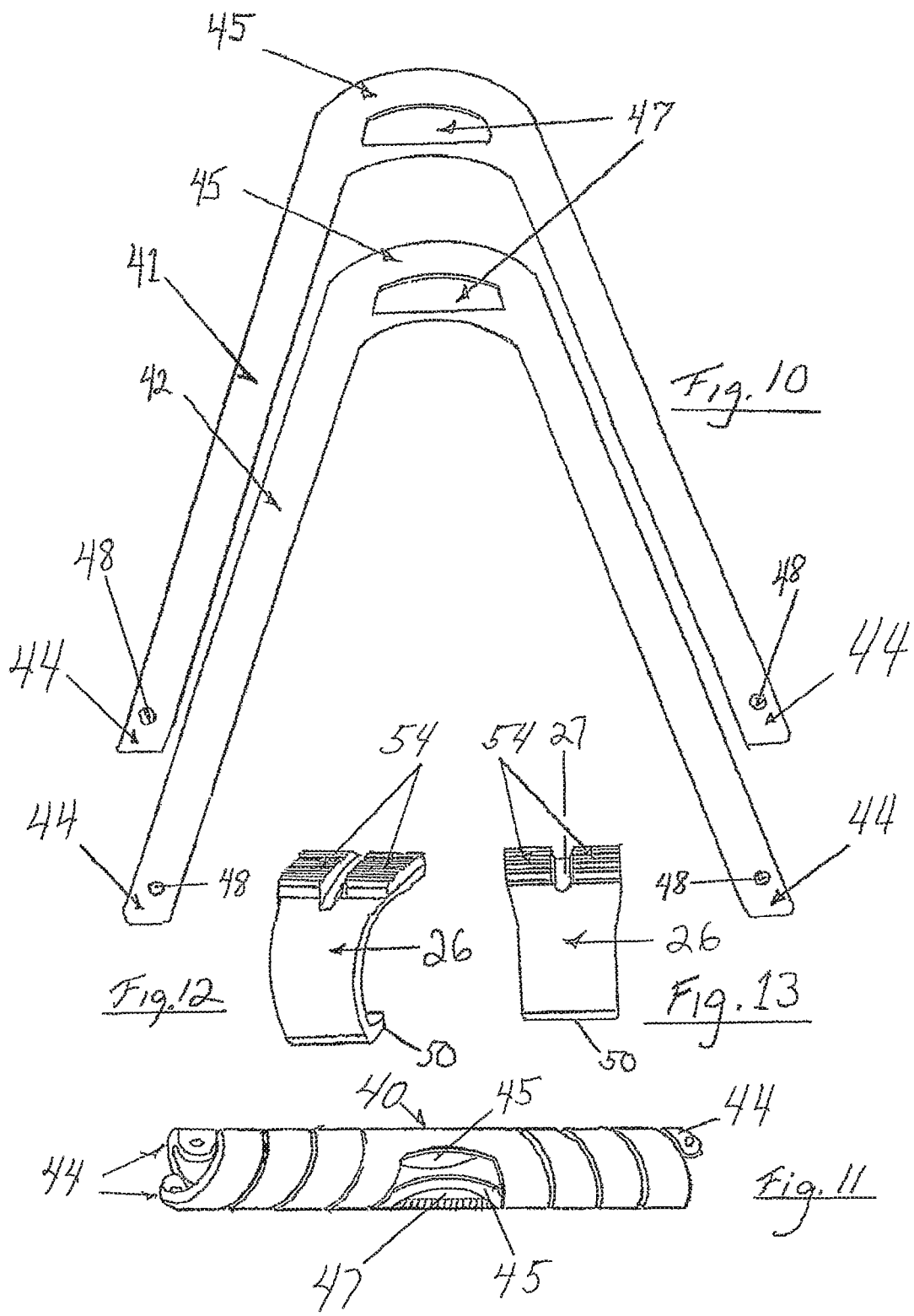

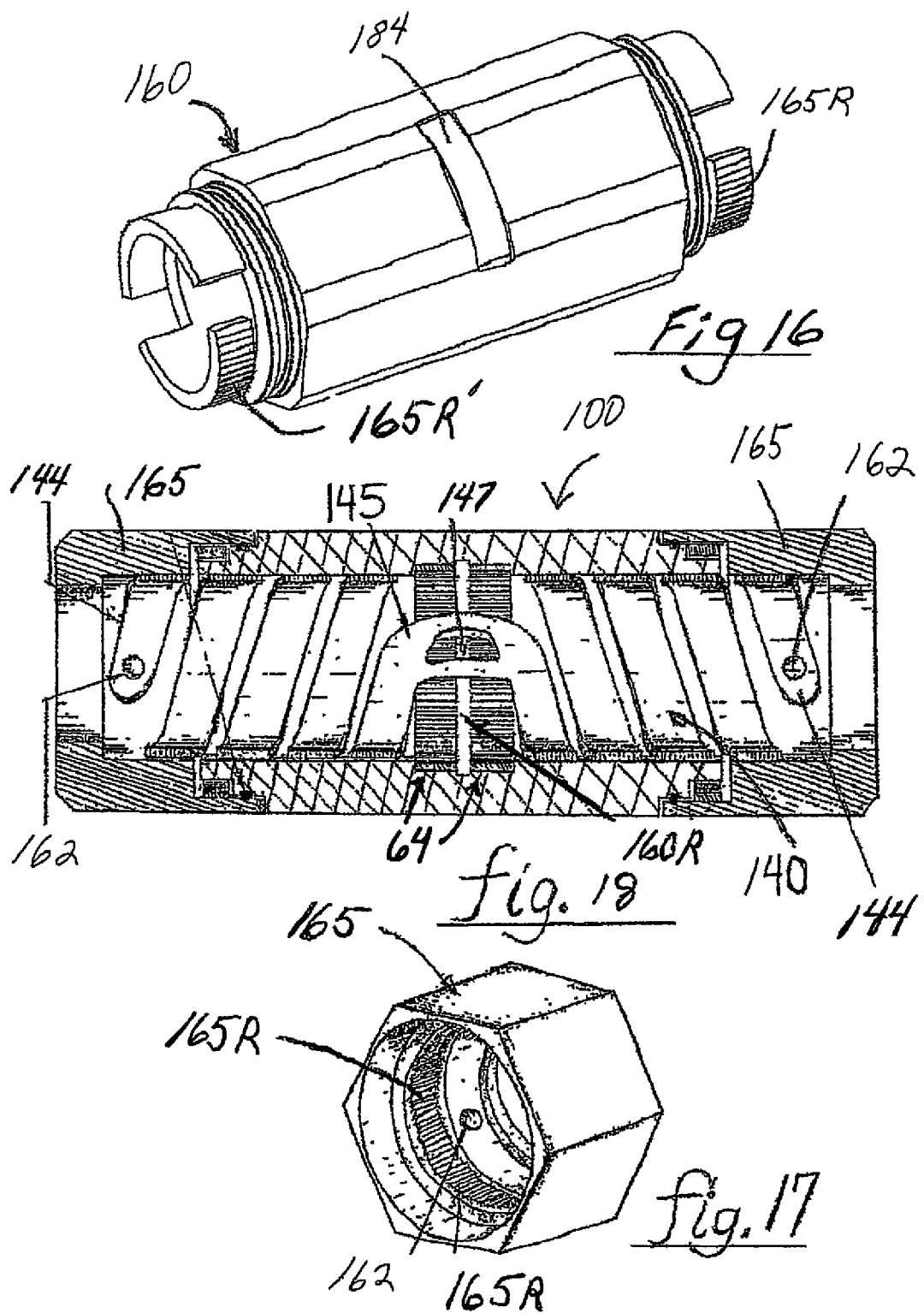

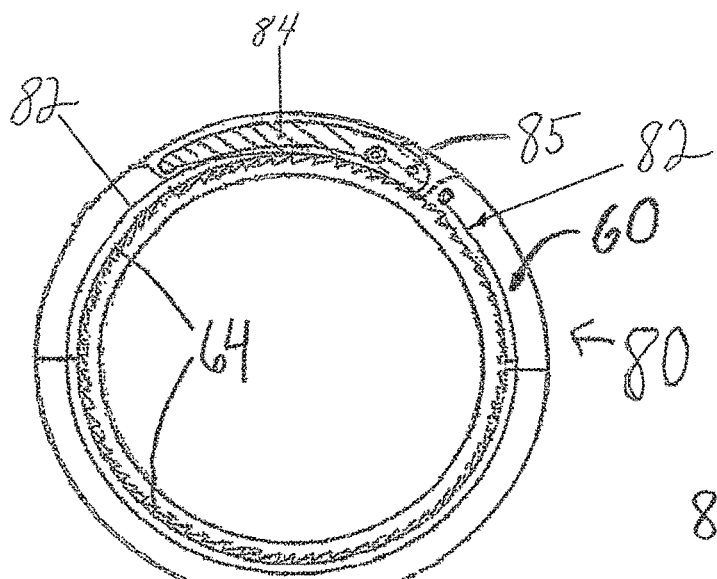
fig. 23A
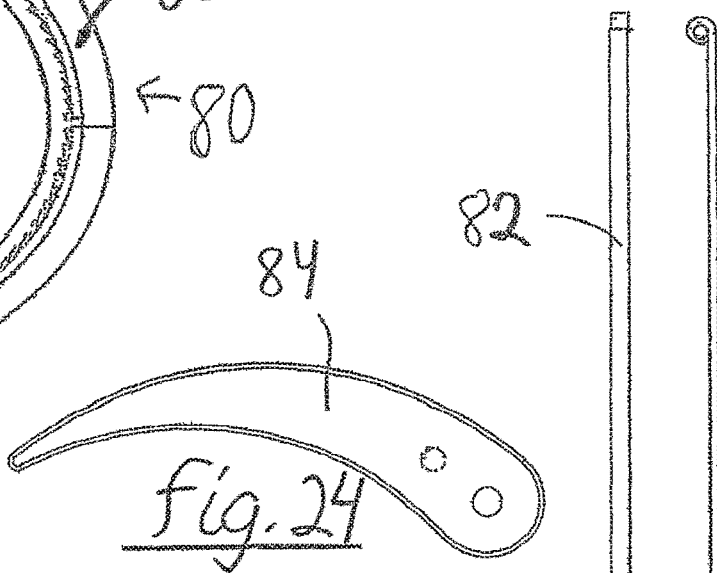
fig. 24
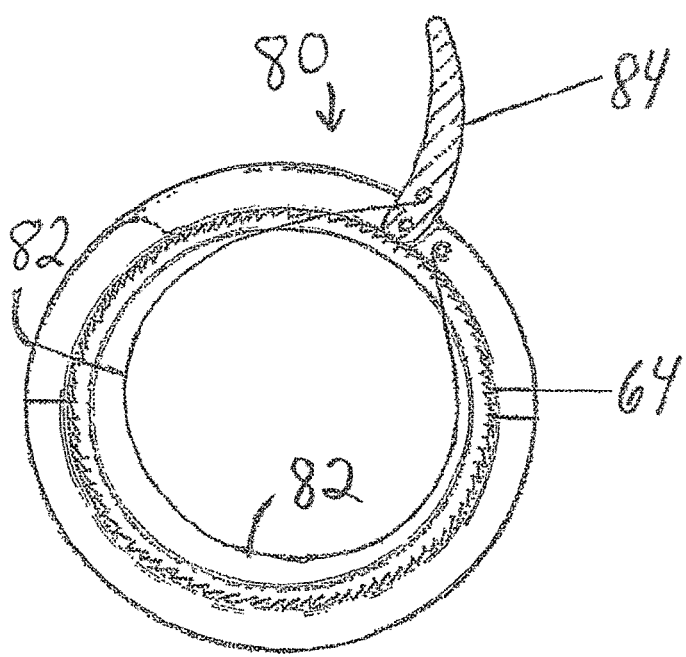
fig. 23B
fig. 25
fig. 26

FLUID CONDUIT CONNECTOR

This application claims benefit of Provisional Application 62/749,140, filed Oct. 23, 2018 and entitled "Fluid Conduit Connector", the entire disclosure of which is incorporated herein by this reference.

BACKGROUND OF THE DISCLOSED TECHNOLOGY

Field of the Disclosed Technology

This disclosed technology relates generally to connectors for a hollow object, for example a fluid conduit, to another structure. Certain embodiments of the connector may connect two hollow elongated objects, for example two fluid conduits, so that the fluid conduits are in fluid communication with each other.

Summary of the Disclosed Technology

The invention comprises a connector comprising one or more spirals for securing a hollow object to a first portion or end of the connector, so that the hollow interior of the hollow object is in communication with a hollow passage through the connector. Certain embodiments of the connector are well-adapted at one portion or end for capturing and sealing to an open end of a first fluid conduit, such as a tube, pipe, or hose, so the hollow interior of the first fluid conduit is in fluid communication with the connector's hollow passage. The capturing and sealing may be accomplished by one or more spirals/spiral-portions being tightened around the first conduit to press/compress and seal the first conduit against and around the circumference of a hollow insert inside the conduit.

In certain embodiments, the hollow insert is a rigid or substantially-rigid hollow insert that is inserted inside an open end of a fluid conduit. The fluid conduit surrounds the hollow insert for a distance extending along the length of the conduit, so that each insert serves as a support structure inside the open end of the conduit. The insert is parallel with and concentrically received inside the hollow interior of the conduit, to be coaxial with the conduit and to place the hollow interior of the conduit coaxial and in fluid communication with the hollow passage through the connector, which hollow passage comprises the hollow inner-passageway of the insert and in some embodiments other hollow portion(s) of the connector and/or a hollow portion(s) of a coupler for connection to another conduit.

In certain embodiments, the fluid conduit is a first conduit, the portion of the insert that is inserted into the open end of the first conduit is a first end of the insert, and the insert further comprises a second end that is in fluid communication with said first end and is adapted to connect to a second conduit. Connection of the second conduit to the insert second end may be performed by structure(s) and method(s) similar or the same as connection of the first conduit to the insert first end. For example, the second end may be inserted into the open end of the second conduit and one or more spirals/spiral-portions may be tightened around the second conduit to press/compress and seal the second conduit against and around the circumference the insert. Therefore, in certain embodiments, the insert second end may be the same or substantially similar to the insert first end, for example, a mirror image of the insert first end, or generally a mirror image but of different length and/or diameter for connecting first and second conduits of different size, diameters, and/or materials. In certain embodiments, therefore, like in the relationship of the first conduit to the first end of the insert, the second conduit end surrounds the second end of the insert that serves as a support structure inside the open end of the second conduit. As with the first end and first conduit, the second end of the insert is parallel with and concentrically received inside the hollow interior of the second conduit, so that the second conduit is in fluid communication with the hollow inner-passageway of the insert and also the first fluid conduit.

In alternative embodiments, the insert second end is connected to the second conduit by structure(s) and method(s) other than a tightened spiral(s) that press(es)/compress(es) the second conduit around the circumference of the second end. For example, the insert second end may comprise, consist essentially of, or consist of a coupler that connects to the second conduit, for example, by conventional hose or pipe connecting means such as a threaded, bayonet, quick-connect, snap-together, or clamped connection.

In certain embodiments, wherein the connection of one or both ends of the insert to a respective conduit is spiral-based, the fit between the hollow insert end and the respective conduit, prior to tightening of the spiral(s), may be snug or close along a substantial portion(s) or the entire length of the hollow insert, but not so tight that it is difficult to push the conduit onto the hollow insert end. After tightening of the spiral(s), the fit between conduit and insert is tight and fluid-sealing all around the outer circumference of the insert end and inner circumference of the conduit in at least one "mating" region of the conduit and the insert, wherein preferably the mating region(s) extend axially along a total of at least ⅓, preferably at least ½, or more preferably at least ⅔ of the axial length of the insert end that is inside the conduit, for enhanced sealing and security of the fluid connection. The hollow insert outer surface may have protrusions or ridges, for example circumferential and/or axial protrusions or ridges to assist in the insert outer surface's gripping and retaining and fluidly-sealing to the inside surface of the conduit, and/or for axial preventing rotation of the conduit relative to the insert. Various sizes of connectors, and the inserts and housing(s) thereof, may be styled/designed for various diameters of conduit.

In certain embodiments, the connector is used by pushing open ends of one or more conduits into the connector over the insert end(s), and then tightening one or more spirals/spiral-portions of a spiral unit around the outer surface of the conduit end(s) to reduce the spiral diameter to an extent that captures and retains the conduit(s) between the spiral(s) and the outer surface of the hollow insert end(s) even when substantial axial force is applied to pull the conduit(s) away from the connector. In certain embodiments, the tightening may be done by rotating/twisting/pulling, directly or indirectly, one end of the spiral relative to the other, in a direction that reduces the diameter of the coils of the spiral/spiral-portion and hence the entire or substantially the entire spiral unit. This reduction of spiral diameter forces the inner surfaces of the spiral coils into tight contact with the conduit, pressing/compressing the conduit between the spiral and the hollow insert end to capture/clamp and seal the conduit inside the connector, in an effective fluid-communication configuration. Because the insert end is rigid, or at least substantially-rigid, the insert end does not collapse, or collapses only an insignificant amount, respectively, whereby the conduit is supported at its inside by the hollow insert end so that the conduit does not collapse or become unsealed from the insert/connector. This way, the conduit is maintained in an open state and secured and sealed, around the entire circumference of the conduit, to the connector for use. If the conduit wall if compressible, the spiral unit will typically compress the conduit wall, in which case the protrusions or ridges provided on the insert end outer surface, if any, may press into the inner surface of the conduit wall to further seal and grip the conduit. The tightness of the spiral around the conduit, and the resulting tightness of the conduit around the insert end, with added O-rings or other seals in certain embodiments if desired, create a reliable fluid seal between the conduit interior and the insert/connector interior passage. Thus, non-leaking fluid flow can proceed through the conduit(s) and through the insert to another conduit or other structure.

The preferred embodiments comprise sealing surface areas that are large compared to the sealing area of conventional conduit connectors, due to the present sealing surface area preferably extending around the entire circumference of the conduit and extending along a relatively long axial distance of the conduit end. The fluid seal is durable and reliable, with the large sealing area(s) and elongated insert and elongated spiral configuration tending to prevent failure or leaking even upon repeated and long-term flexing or moving of the conduits and/or even upon temperature swings and inclement environments.

These and/or other embodiments, methods, and objects of the invention will be apparent to those of skill in this field, from the drawings and the detailed description that follows.

BRIEF DESCRIPTION OF THE DRAWINGS

FIG. 5 is a cross section of the housing and spiral of FIG. 4, showing two of the outer ends of the spiral unit for being anchored to the inner surface of the housing, and showing one of the central insert-connection apertures of the spiral unit for connecting to a spiral-connection protrusion of the insert (not shown in this view).

FIG. 6 is a side view of the insert of FIG. 4, which is shown here and in FIG. 4 in combination with an embodiment of a ratchet arm/clip that is part of a latching system for the connector.

FIG. 7 is a cross-section of the connector of FIG. 1, assembled and in-use with two conduits as in FIG. 3, wherein the spiral unit has been tightened around the two conduits and latched by the latching system two ratchet arms/clips provided diametrically opposed (at or about 180 degrees apart) on the insert and cooperating with ratchet teeth of the connector housing.

FIG. 10 is a side view of two strips that are may be used to form a spiral unit such as that portrayed in FIGS. 4, 5, 7, prior to bending the components into the spiral unit.

FIG. 11 is a side view of the spiral unit, as in FIGS. 4, 5 and 7, formed by bending/forming the components of FIG. 10 into a double-spiral, the center/middle of the spiral unit featuring two central insert-connection apertures diametrically opposed (at or about 180 degrees apart), for connection of the center/middle of the spiral unit to the insert, and each end of the spiral having two anchor points/apertures diametrically opposed (at or about 180 degrees apart), for being anchored to the inside surface of the connector housing.

FIG. 12 is a perspective view of the ratchet arm/clip that is installed in the insert in FIGS. 4, 6, and 7, wherein two of the ratchet arms/clips preferably are installed diametrically opposed (at or about 180 degrees apart), from each other on the central outer surface of the insert.

FIG. 13 is a side view of the ratchet arm/clip of FIG. 10.

FIG. 16 is a side perspective view of the central housing of the connector of FIG. 14.

FIG. 17 is a side perspective view of one of the actuator ends of the connector of FIG. 14.

FIG. 18 is a cross-sectional view of the housing, and the spiral unit inside the housing, of the connector of FIG. 14.

FIG. 23A is a cross-sectional, schematic view of portions of the latching system as used in the embodiments of FIGS. 1-22, with the lever is in the latched position.

FIG. 23B is a cross-sectional, schematic view of the lever embodiment of FIG. 23A, wherein lever is pivoted to an unlatched position, where it pulls a cable/strap into a smaller diameter condition inside the housing.

FIG. 24 is an enlarged end view of the lever of FIGS. 23A and B.

FIG. 25 is an enlarged side view of the cable/strap of FIGS. 23A and B.

FIG. 26 is an enlarged end view of the cable/strap of FIGS. 23A and B.

FIG. 27A portrays the latching system in the latched condition, wherein the lever is against the housing, and the resilient bias of the ratchet arms/clips is causing the arms/clips to engage their ratchet arms/clips teeth with the ratchet teeth on the inside of the housing.

FIG. 27B portrays the latching system in the unlatched condition, illustrating the lever and cable/strap of the unlatching system, wherein the lever has pulled the cable/strap to a smaller diameter, which pulls both ratchet arms/clips away from their engagement with the housing ratchet teeth, which will allow the insert to which the ratchet arms/clips are attached/anchored to rotate, which allows the spiral coils (not shown in this view) to rotate to a loosened configuration that unlatches the spiral from the conduit(s).

DETAILED DESCRIPTION OF CERTAIN EMBODIMENTS

Figure 8:
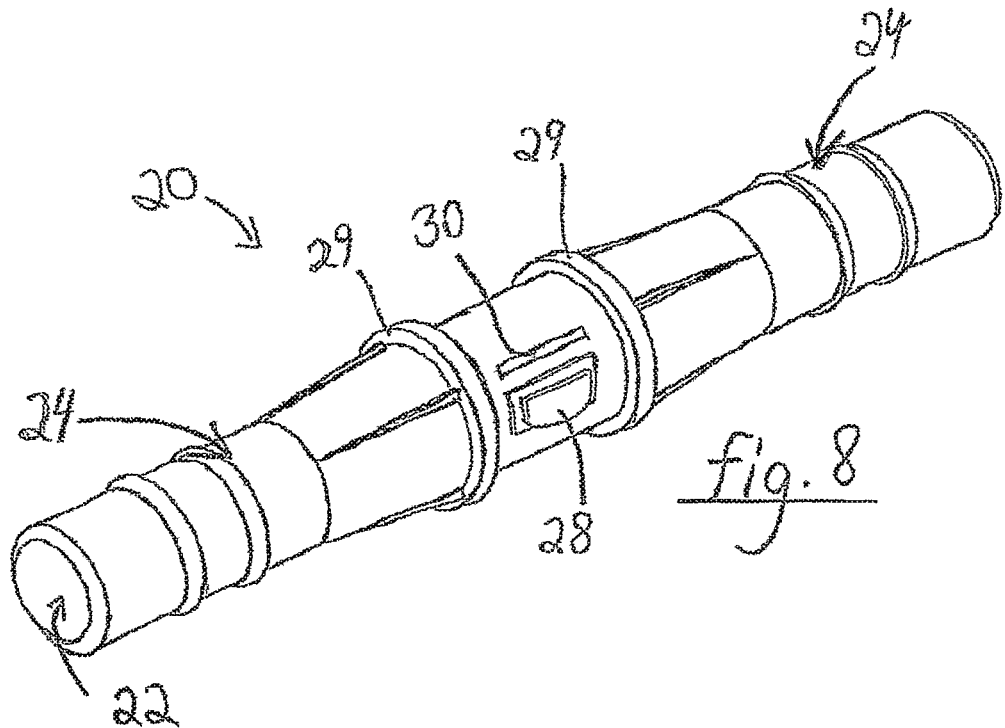
FIG. 8 is a side perspective view of the insert of FIGS. 4, 6, and 7, without the ratchet arm/clip installed on the insert, and showing a recess into which an end of the ratchet arm/clip may be installed.
Figure 9:
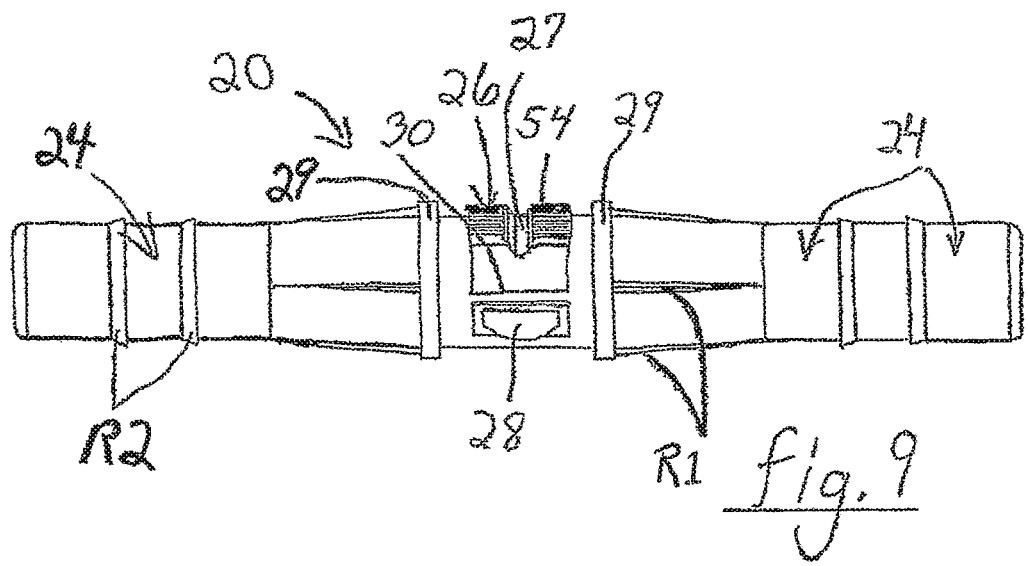
FIG. 9 is a side view of the insert of FIG. 8, with a ratchet arm/clip installed in the recess on the insert.
Figure 14:
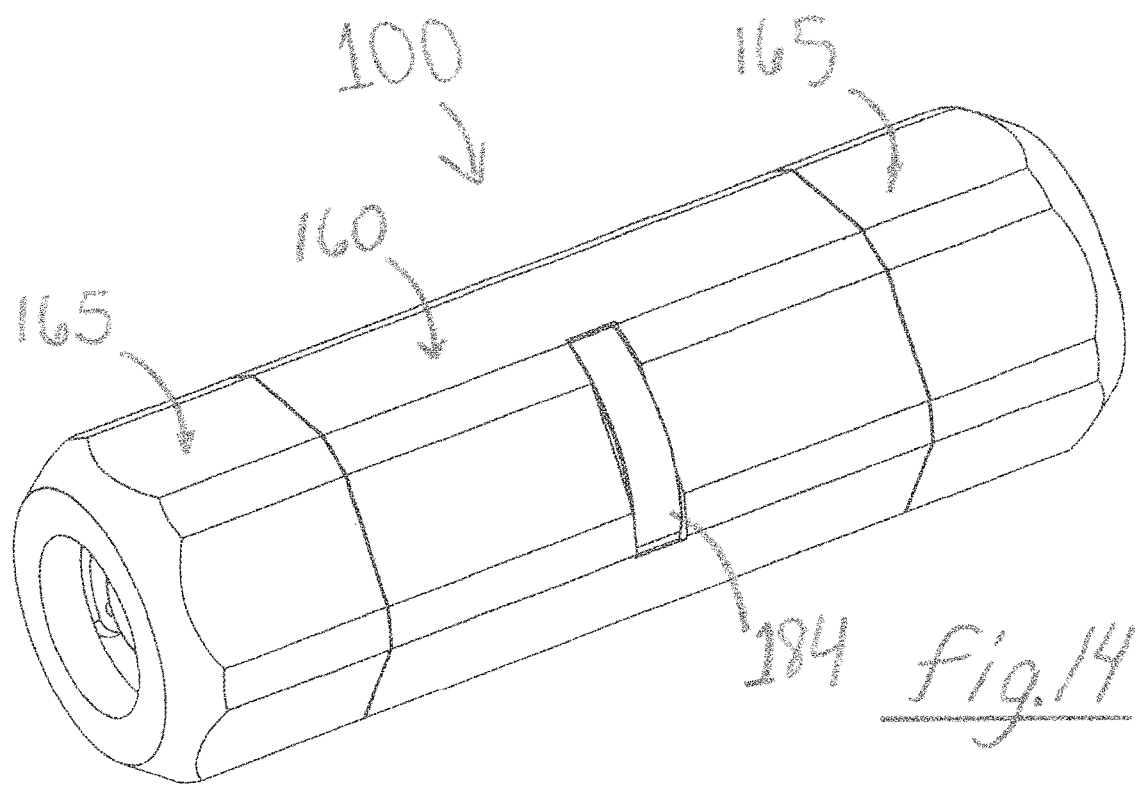
FIG. 14 is a side perspective view of another embodiment of the invented connector, wherein the connector housing comprises three portions, namely a central housing or "housing collar", and two actuator ends.
Figure 15:
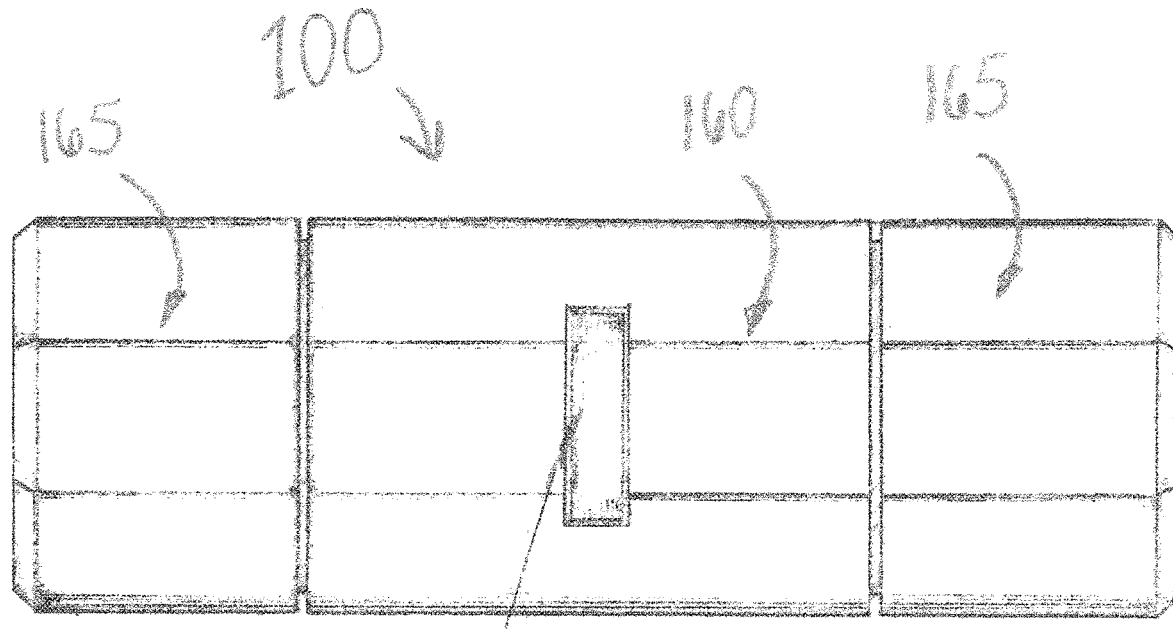
FIG. 15 is a side view of the connector of FIG. 14.
Figure 19:
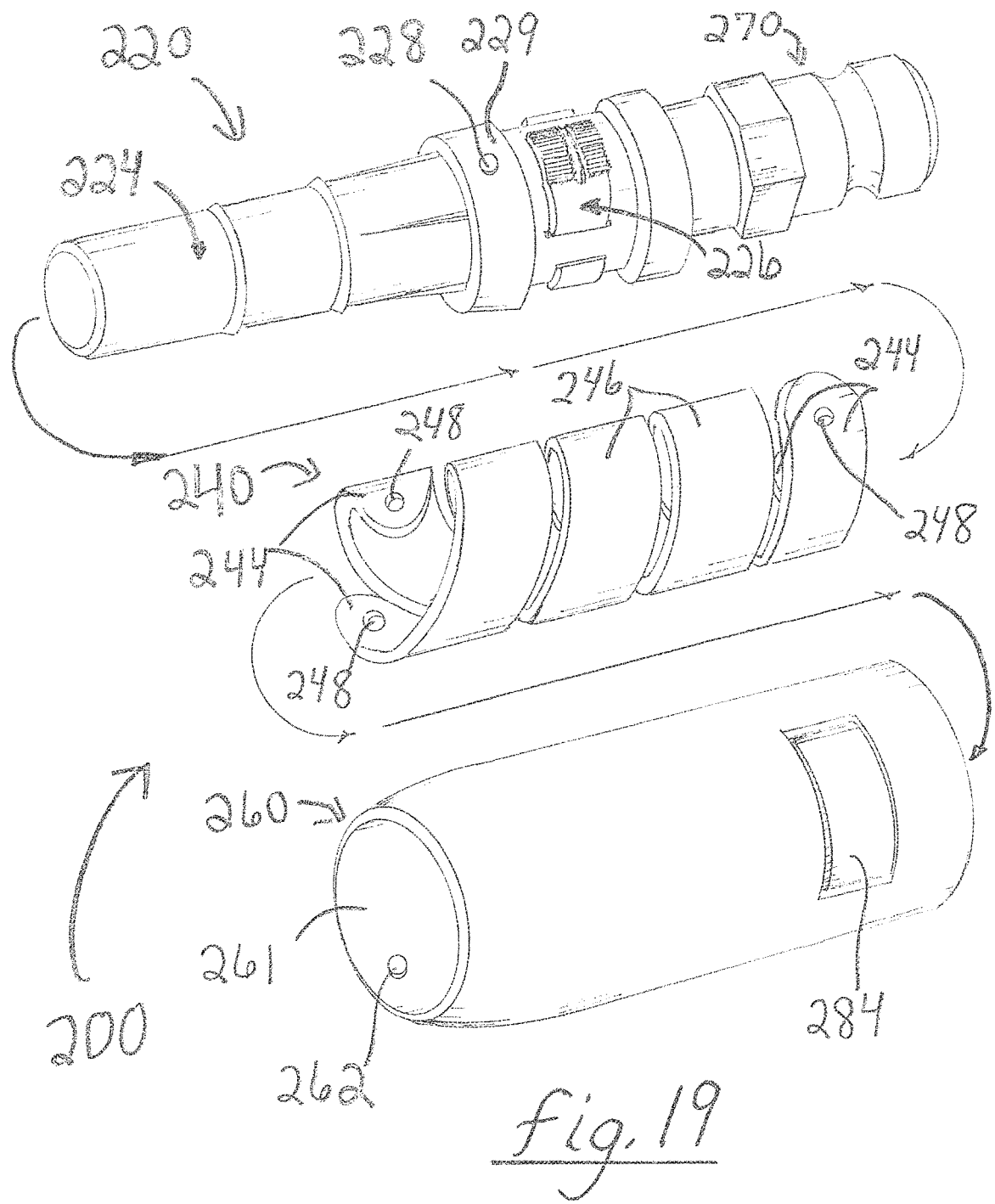
FIG. 19 is an exploded, side perspective view of the main components of an alternative embodiment of the invented connector, wherein alternative embodiment of an insert combined with a ratchet arm/clip is at the top, an alternative embodiment of a spiral unit is in the center, and an outer housing is at the bottom, of the drawings, and wherein the connector is assembled by the spiral unit being placed inside the housing, and the insert placed inside the spiral unit to position these main components parallel and coaxial with each other.
Figure 20:
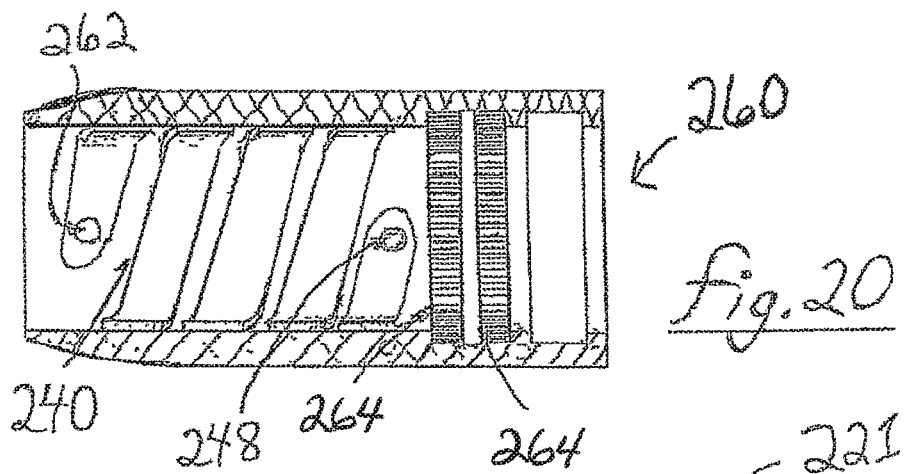
FIG. 20 is a side cross-sectional view of the housing of the connector of FIG. 19 with the spiral unit inserted into the housing, showing an outer ends of the spiral unit for being anchored to the inner surface of the housing, and showing another end of the spiral unit one for connection to the insert (not shown in this view).

Referring to the Drawings, there are shown several, but not the only embodiments, of the invented connector comprising and using a spiral element, or simply a "spiral", to capture a hollow object in the connector. Here and throughout this document, the term "a spiral unit" is also used for certain embodiments, to describe a coiled element that may comprise one or more spirals, for example, a single spiral, or multiple spirals connected together or even disconnected from each other but supplied in a form wherein the spirals share a common longitudinal axis. The connector may be especially-beneficial for connecting one or more fluid conduits in fluid communication. The connector may be adapted to cooperate and connect to various sizes and materials of tubing, pipes, hoses or other hollow members, for example, for hydraulic or pneumatic fluids, food or beverage fluids, oil or chemicals, gases, medicinal or healthcare fluids, fluidized powder/particulate, and/or other fluid chemicals, compounds, and mixtures. FIGS. 1-7 illustrate an embodiment of the invented connector that is used for connection of two fluid conduits in coaxial relationship, so that the two conduits are securely captured in the connector in fluid communication with the connector and with each other. FIGS. 8 and 9 illustrate an embodiment of an insert that receives and supports conduits on and around the outside of each end, so that a spiral unit may be tightened around the conduits to capture the conduits between the spiral unit and the insert. FIG. 10 illustrates an embodiment of two strips that may be bent, curved, or otherwise formed into the double-spiral unit of FIG. 11. FIGS. 12 and 13 are views of an embodiment of a ratchet arm, which is called "ratchet clip" hereafter, that may be fixed at one end to the spiral unit, so that the other end of the ratchet clip extends to engage the ratchet teeth of a portion of a connector housing to latch the spiral to the housing, to maintain a given amount of spiral unit tightness after the spiral unit has been rotated to that tightness. FIGS. 14-18 illustrate an alternative embodiment used for connection of two fluid conduits, so that the two conduits are securely captured in the connector in fluid communication with the connector and with each other, wherein this embodiment uses rotation of one or both ends of the housing relative to a central portion of the housing, to tighten the spiral unit. FIGS. 19-22 illustrate yet another alternative embodiment used for connection of one fluid conduit that is secured and sealed to the connector by a spiral unit, to an exemplary conventional coupler, to place the conduits in coaxial relationship and fluid communication. FIGS. 23A, 23B, 24-26, 27A and 27B, schematically illustrate an embodiment of a unlatching system, featuring operation of a lever and cable system, for latching the connector and its spiral unit in a tightened condition capturing and connecting the conduit(s) to the connector, and for unlatching the connector and its spiral unit so that the spiral unit can move to a loosened condition that allows removal of conduit(s) from the connector.

In certain embodiments, tightening of the spiral unit is accomplished by relative movement of multiple portions of the connector, for example, relative rotation or other relative movement of multiple rigid structures of the connector each connected/anchored to the spiral, for example, a housing and an insert, or multiple portions of a housing that are movable relative each other. For example, the spiral unit may be fixed to an interior surface of a housing, such as an interior surface of a housing "collar", that is adjacent and surrounding the spiral unit, and another portion of the spiral unit may be fixed to an outer surface of an insert that is inside the spiral unit, so that relative rotation of the housing and the insert will tighten the spiral. For example, in certain other embodiments, one or more end portions of the connector housing are rotatable relative to a central housing collar, with a center region of the spiral unit fixed to the collar and end region(s) of the spiral unit fixed to the end portion(s) of the housing, so that rotation of one or both end portions relative to the housing central housing collar, will tighten the spiral.

In FIGS. 1-7, connector 10 comprises a hollow rigid insert 20 with ends 24, a ratchet clip 26 connected to the insert 20, a hollow spiral unit 40 formed from two spiral strips 41, 42 (FIG. 10) each having two ends 44 and each with a central insert-connection aperture 45, a hollow housing 60 (also "housing collar"), and a latching system 80 comprising a ratchet system, and an unlatching system comprising a cable 82 controlled by a lever 84 to unlatches a ratchet clip 26.

Latching system 80 comprises an "insert-housing ratchet mechanism", that may be described as controlling relative movement/rotation of the insert (and typically therefore a portion/end of the spiral) and the housing or a portion of the housing, for example by use of ratchet arm(s)/clip(s) provided with the insert that "latches" the insert to the housing/housing-portion. In alternative embodiments, such as connector 100 described later in this document, the latching system also comprises an "inter-housing-parts ratchet mechanism" that may be described as controlling relative movement/rotation of two portions of the housing (and typically therefore a portion of the spiral), for example by use of ratcheted housing portion surfaces that each comprise ratchet teeth that cooperate to accomplish said control. Therefore, "controlling" in this context may mean, in certain embodiments, holding certain connector components in position relative to each other after and/or during tightening of the spiral(s)/spiral-unit, and/or, in certain embodiments, allowing relative rotation of connector components in one relative direction but not in the reverse relative direction.

An unlatching system is also provided in certain embodiments to make the connector/spiral tightening reversible/unlatchable, for example, the unlatching system 83 illustrated in FIGS. 23B, 24-26, and 27B that is adapted to disengage the ratchet-interaction of the housing and insert, for example, by use of the lever and cable system. Thus, system 80 may be described as one example of an unlatchable, disengagable, and/or disconnectable latching system.

The spiral unit 40 may be formed from multiple spiral of coils, for example, the two spiral strips 41, 42 that, when formed into coils 46, are positioned at, or about, 180 degrees apart in the unit 40. This way, the ends 44 of the two spiraled strips 41, 42 are diametrically opposed (that is, at, or about, 180 degrees apart), to be near and anchored to areas of the housing inner surface 61 that are diametrically opposed. Also, this way, the central arch 45 of each spiral strip 41, 42 and their respective central insert-connection apertures 47, are diametrically opposed for connection/anchoring to the insert, for example, to insert-protrusions 28 that are also diametrically opposed on the central region of the insert 20 between the central flanges 29. Note that, in cross-sectional FIG. 5, a first arch 45 and its first aperture 47 are visible because the viewer is looking at the "back half" of the spiral unit and the housing, while, in FIG. 7, a second arch 45' and its second aperture 47' are visible at the left of the figure (diametrically opposed from the arch and aperture in FIG. 5), as the viewer is looking at the "front" of the spiral unit and the conduit C1. Therefore, in the figures, depending on the perspective, one of two central arches 45 and one of two apertures 47 are typically visible, but it will understood that another arch and aperture are diametrically opposed in the connector from the arch and aperture that are visible. Also, in the figures, depending on the perspective, one of preferably two ratchet arms, for example, ratchet clips 26, and one of two insert-protrusions 28 are visible, but it will understood that another ratchet clip and another insert-protrusion are diametrically opposed from the clip and protrusion that are visible. For example, in FIG. 7, two ratchet clips 26, 26', about 180 degrees apart, are visible. This double-spiral form of spiral unit 40, and the multiple attachments of the spiral unit to each of the housing and the insert, via two spiral strips 41, 42, creates a strong, durable connector, with multiple spiral connections symmetrically placed around the connector axis, that works smoothly and reliably to very effectively capture conduits C1, C2. Great forces may be applied via the spiral unit 40 to the conduits C1, C2 for holding high pressures of fluid in the conduits and the connector.

Connector 10 may be used to connect two conduits C1 and C2 in fluid communication via the inner-passageway 22 of hollow insert 20, and the hollow passage or "interior passageway P" of each hollow conduit C1, C2. FIGS. 8-13 illustrate some of the components of connector 10, specifically, flexible and resilient spiral strips 41, 42 that are formed into spiral unit 40, and flexible and resilient ratchet clip 26 that is fixed or otherwise connected to the insert 20 for serving in the latching system 80.

Figure 4:
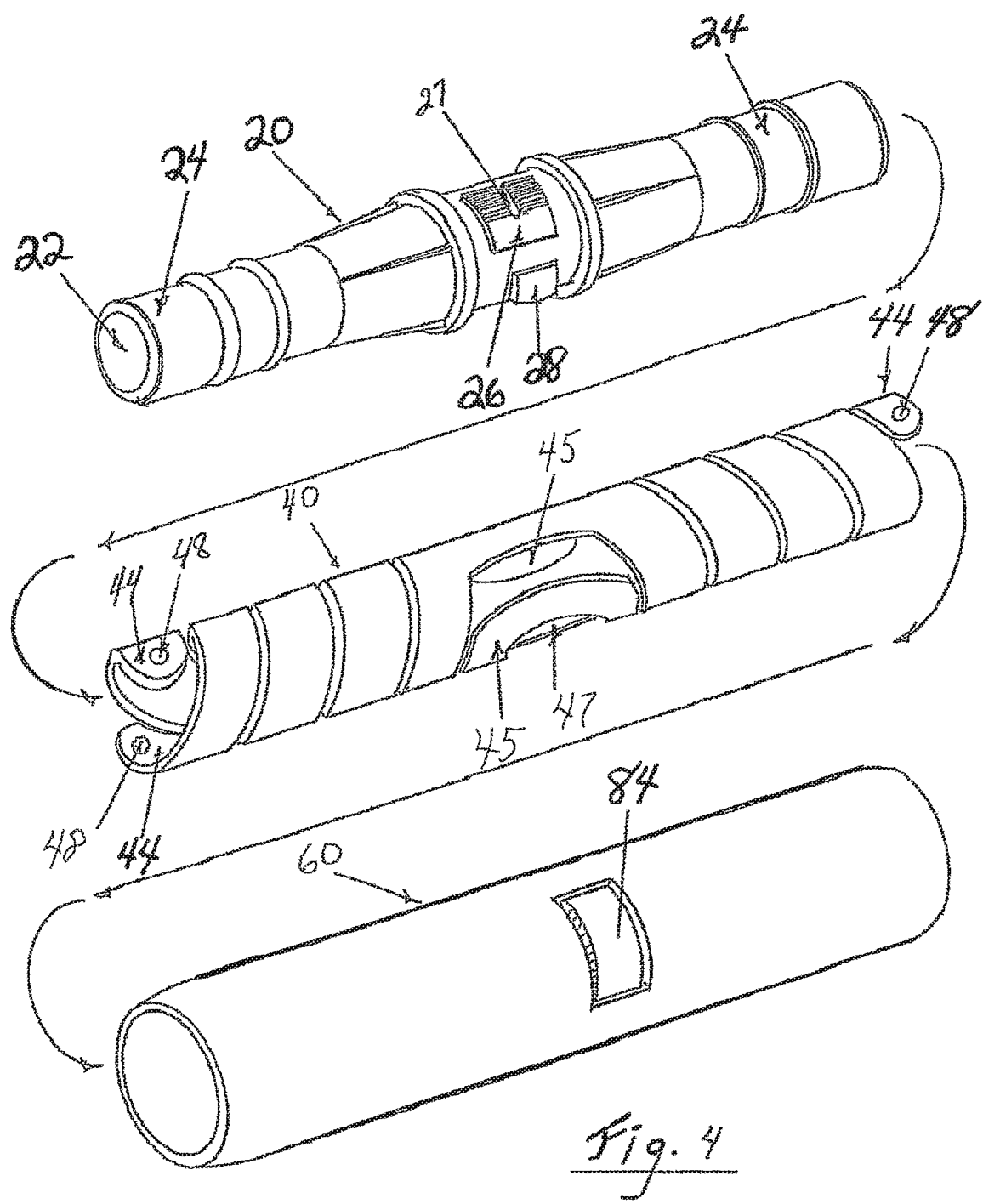
FIG. 4 is an exploded, side perspective view of the main components of the connector of FIG. 1, namely an embodiment of an insert combined with a ratchet arm/clip at the top, an embodiment of a spiral unit in the middle, and the outer housing at the bottom, of the drawings, wherein, the connector is assembled by the spiral unit being placed inside the housing, and the insert placed inside the spiral unit to position these main components parallel and coaxial with each other.

As illustrated by FIGS. 4, 5 and 7, in the assembled connector 10, the insert 20, spiral unit 40, and housing 60 are parallel and coaxial to each other, with insert 20 inside the spiral unit 40, and the spiral unit 40 inside the housing 60, with enough room between the spiral unit 40 and the insert 20 at the insert ends 24, when the spiral unit 40 is in a relaxed larger-diameter condition, to receive the open ends of the conduits C1, C2. Connector 10 is used by inserting conduits C1, C2 into opposite open ends of the connector 10. The open ends of the conduits C1, C2 are each slid, or are pushed, over the their respective opposing ends of insert 20, to place the conduits C1, C2 between the housing 60 and the spiral unit 40, so that multiple of the coils 46 of the spiral unit 40 encircle each conduit C1, C2.

FIG. 5 is a cross-section illustrating the spiral unit 40 installed in the housing 60, with outer ends 44 connected/secured to the inner surface 61 of the housing 60, for example, by peg anchors 62 that are fixed to, or integral with the housing, and that extend radially-inward from the housing inner surface 61 to be received securely inside holes 48 of the spiral unit ends 44. In the cross-section of FIG. 5, half of the housing 60 and half of the spiral unit 40 are visible. One of the central insert-connection apertures 47 is visible and is for connection to one of the two insert-protrusions 28 that are fixed to, or integral with the insert, at, or about, 180 degrees apart on the insert 20. Therefore, the outer ends 44 of the spiral unit 40 are secured/fixed to the housing and the center (central arches 45) of the spiral unit 40 are secured/fixed to the insert 20.

The ratchet clips 46 serve to latch the spiral in a given position and tightness relative to the conduits C1, C2, and the insert. Each clip 46 may be integral with, or connected to, the insert 20, with the end 50 of the clip in or at the surface of the insert 20, and the clip 46 extending from, and curving away from, the insert surface toward the housing to place the opposite clip end, which comprises ratchet teeth, parallel/generally-parallel to the housing inner surface, for the ratchet teeth 54 to effectively engage the ratchet teeth 64 on the central inner surface of the housing 60. Of note are a relatively smooth groove 27 between two rows of teeth 54 on the clip 26, and a relatively smooth ring 61' of the inner surface of the housing collar 60 between the rings of teeth 64, as the groove 27 and ring 61' are useful for holding a cable of the unlatching system as will be described later in this document.

Clip 26 may be integral with the insert in certain embodiments, but, in connector 10, clip 26 is a separate piece that is connected to the insert, for example, by clip end 50 being received and secured in the recess 30 of insert, for example, by conventional means comprising a friction fit and/or an adhesive. Clip 46 is bendable and resilient, so that it is naturally biased to extend away from the insert 20 toward the housing teeth 64 to engage with the teeth 64, but may be pulled to flex away from the teeth 64 to disengage the clip teeth 54 from the housing teeth 64, as will be described further below.

In use of the connector 10, conduits C1, C2 are inserted into the assembled connector 10, with the spiral unit 40 (both spirals formed by strips 41, 42) in its relaxed/loosened condition, which is the spiral unit's 40 natural inclination due to its resilience and which features a large diameter of the unit 40 so that the coils 46 are distanced from or loosely contacting the outer surface of the conduits. The conduit open ends extend along the insert ends 24 a substantial distance, engaging multiple of the ribs R1 and ridges R2 or other texture, for increased security on the insert. The insert ends 24 in certain embodiments are slightly tapered in outer diameter from a relatively-smaller outer end to a larger inner end at the central flanges 29, for example, for accommodating various conduit inner diameters. In certain embodiments, the conduit ends may extend all the way inward to the central flanges 29 of the central region of the insert 20. In certain embodiments, there may be sealing material or members on/at the central flanges 29 or elsewhere, to help seal the conduits to the insert at the flanges 29 and/or the insert's outer surface.

After pushing the conduits into place on the inserts, the housing 60 is rotated on its axis relative to the insert 20. By virtue of the ends 44 of the spiral unit 40 being fixed to the housing 60 and the central arches 45 being fixed to the insert 20, the relative rotation may be done in a direction that tightens the spiral unit 40 on the conduits by the diameter of the spiral unit 40 (both spirals 41, 42 and typically all the coils 46) becoming reduced. The reduced diameter/inner-diameter of the coils 46 causes the coils 46 to press against the conduits, in turn pressing the conduits against the cylindrical or generally cylindrical ends 24 of the insert. The 360 degree-extending coils 46 of the spiral unit press/compress the conduits all the way around the circumference of each conduit, to force and seal the conduit on the insert, all the way around the circumference of the insert ends. This way, the spiral unit 40 captures and retains the conduits C1, C2 on the insert 20 inside the connector 10, with the conduits in fluid communication with the inner-passageway 22 of hollow insert 20, which inner-passageway 22 extends continuously longitudinally through the entire insert 20, so that the conduits are in fluid communication with each other. The tightening of the spiral unit creates substantial force on the conduits and therefore on the insert 20, with the material of the conduits determining whether the force compresses the conduits between the spiral unit and the insert. The insert 20 is preferably entirely rigid or rigid except for optional seals or sealing material in some locations, as will be understood by one of skill in the art. Especially, the ends 24 of the insert are preferred to be rigid, so that said substantial force of the spiral will not collapse, bend, or deform the tubular shape of the insert ends 24, especially not to an extent or shape that would create gaps between the conduits and the insert that would allow leaking of liquid out of the conduits through the gaps.

Figure 1:
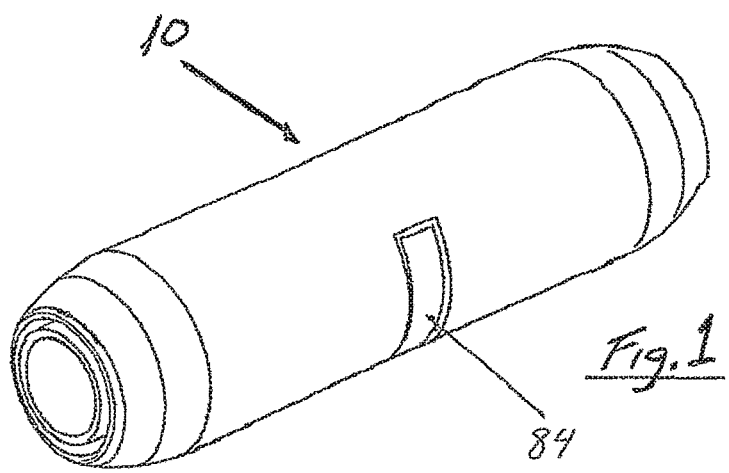
FIG. 1 is a perspective view of one embodiment of the invented connector.
Figure 2:
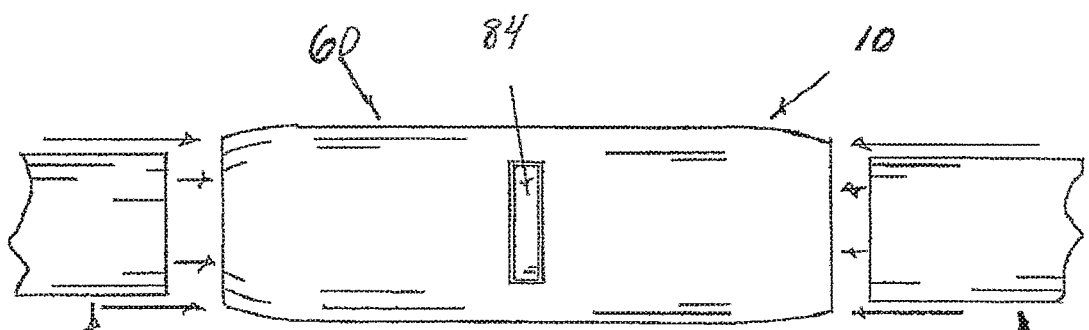
FIG. 2 is a side view of two exemplary conduits being inserted into the connector of FIG. 1.
Figure 3:
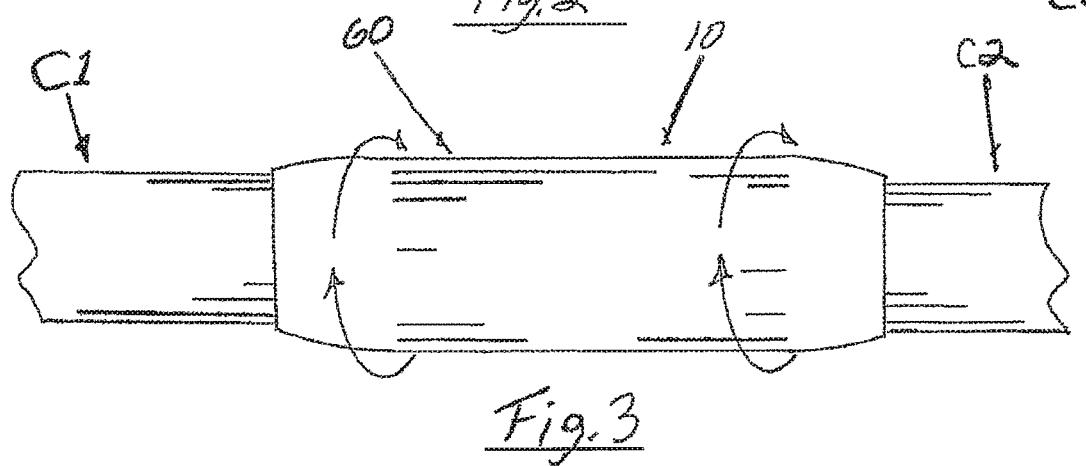
FIG. 3 is a side view of the connector of FIG. 1, with conduits inserted into the connector as illustrated by FIG. 2, wherein a housing of the connector is being rotated relative to the conduits to tighten internal spirals around the conduits to press and seal the conduits against an insert (not visible in this view) that supports the conduit open ends inside the connector.

Tightening of the spiral unit 40 may be done by manual action, or action by tools, for example. Referring to FIG. 3, the user may grasp the housing 60 in one hand and a conduit in the other, and rotate the housing relative to the conduits. This is particularly effective in embodiments wherein the conduits are tight enough on the insert, even when the spiral is relaxed, so that gripping the conduit near the connector effectively also controls the position of the insert. Thus, rotating the housing and the conduit-and-insert combination relative to each other, serves to rotate the housing relative to the insert, thereby tightening the spiral. In certain embodiments, for example wherein both conduits are so tight they are immovable relative to the insert, both the conduits may be grasped/gripped for example, in a tool or jig, and the housing may be turned manually by hand or by tool relative to the insert.

Due to the size, shape and position of the ratchet clips 26, and the clips' natural resilience that pushes the outer end of the clip 26 radially outward toward the housing, the teeth 54 of the ratchet clip engage the teeth 64 that extend circumferentially around the housing inner surface at/near the middle/center of the housing. Preferably, two rings of teeth 64 are provided, separated by smooth ring 61' of surface between the rings of teeth 64, and extend all the way around the housing inner surface. Therefore, the preferred the ratchet clip teeth 54 can engage the housing teeth 64, at any and all locations around the 360 degree teeth rings all around the inner circumference of the housing, and therefore when the insert is in any position relative to the housing, and throughout and after rotation of the housing relative to the insert 20 and clip 26. Further, in embodiments wherein multiple ratchet clips 26 are provided at different angular positions on the insert, the multiple ratchet clips 26 may all engage the rings of teeth 64 when the insert is in any position relative to the housing, and throughout and after rotation of the housing relative to the insert 20 and clips 26.

Upon rotation of the housing relative to the insert and conduits, in a first direction (shown by rotation arrows in FIG. 3), the ratchet teeth 64 of the housing 60 will slide across the teeth 54 of the clip(s) 26, in ratchet manner, so that said rotation is allowed. However, when the housing or insert/conduit are released, the engagement of teeth 54 and teeth 64 will not allow relative rotation in the opposite direction, so the housing and insert-conduit combination is not allowed to rotate back toward their original relative positions. Thus, the teeth 54, 64 latch the connector, and therefore the spiral unit 40, in the tightened position/configuration. Thus, tightening of the spiral may be done, if desired, in stages, and after each stage of tightening by relative rotation in the "allowed direction", the ratchet system of teeth 54, 64 will hold the connector in that position/configuration. When the desired amount of tightening is achieved, the connector may be released, and it will be latched, in that condition for use of the connected conduits, with latching prevents relative rotation in the "not allowed direction". FIG. 5 illustrates the spiral unit 40 in the relaxed, large-diameter condition, and FIG. 7 illustrates the spiral unit 40 after tightening around the conduits C1, C2 in the tightening, relatively-smaller diameter condition. One may see, in FIG. 7, some compression of conduit C1 by the spiral coils 46, which illustrates that conduit C1 is somewhat compressible, and also illustrates that the insert 20 coaxial with, and inside, conduit C1 is rigid and not compressible or collapsible, thus retaining the insert in its original shape and diameter to support and liquid-seal with the conduit C1.

Alternative ratchet arm(s) may be used, with alternative connections to the insert, with objects of the ratchet arm(s) being that the arm(s) are biased outward against the housing, to engage the housing for latching the connector, but are releasable by flexing of the arm(s) or other movement of the arm(s), when unlatching is implemented. In certain embodiments, unlatching elements and process are provided that is adapted for the ratchet clip(s) of connector 10. The unlatching elements and process, described later in this document in more detail, comprise a lever 84 or other actuator accessible at the outside of the housing, which, when actuated by pivoting the lever, pulls a cable into a smaller-diameter condition that pulls the ratchet clip(s) teeth-end away from the ratchet teeth of the housing, to disengage the clip(s) from the housing. This disengagement of the ratchet mechanism serves to release the insert-conduit combination from the housing, allowing relative rotation of the housing and the insert-conduit combination in the reverse direction, that is, the previously-not-allowed direction. The relative rotation in the reserve direction, which may be urged by the natural bias of the spring unit, serves to loosen the spiral unit into the larger-diameter condition to release/reduce pressure from the outside of the conduits so that the conduits may be pulled off the insert and out of the connector when desired.

The connector 10 may be described as an embodiment wherein a latch element, such as ratchet clip 26, protrudes radially outward through an aperture in the spiral unit, such as a space between the coils 46, for example near the arch 45, to engage the housing in a manner that allows movement of the insert and conduit combination relative to the housing in a first relative direction, but that does not allow movement in a second, opposite relative direction, for example, unless and until an unlatching process is uses. Also, this connector 10 may be described as an embodiment wherein tightening of the spiral is done by anchoring of different portions of the spiral unit to the insert and to the housing, for example, anchoring a central portion(s) of the spiral unit 40 to a central region of the insert, and anchoring end portions of the spiral unit 40 to a portion of the housing such as the single housing collar.

FIGS. 14-18 illustrate an alternative embodiment, connector 100, for connecting two conduits. Connector 100 may be described as an embodiment wherein a multiple-part housing is supplied, wherein the multiple housing parts are connected by ratchet mechanism(s) that may be called the "inter-housing-parts ratchet mechanism" 165R (165R being shown on the end-part 165 and cooperating 165R' being shown on the collar 160). The multiple housing parts may comprise a housing collar 160, similar to that in connector 10, and a housing end-part 165. In connector 100, a central portion(s) of the spiral unit 40 is anchored to a central region of the insert, similarly or the same as in connector 10, and the end portion(s) of the spiral unit 140 is/are anchored to a housing end-part 165. Tightening of the spiral unit may be done by rotating an housing end-part 165 relative to the housing collar 165 in a direction "allowed" by the inter-housing-parts ratchet mechanism 165R and the "insert-housing ratchet mechanism" (see 160R in FIG. 18 understood to cooperate with an insert ratchet element, such as a ratchet clip as described above). Note that, rotating the housing end-part relative to the housing collar may also be described as rotating the housing end-part relative to the insert, as the insert-housing ratchet mechanism (160R) prevents relative rotation of the housing collar and the insert in the not-allowed direction of the ratchet teeth 160R, when the collar is grasped and the end-part is rotated in the spiral-tightening direction of the inter-housing-parts ratchet mechanism 165R. Such rotation tightens the spiral unit 140 via one portion of the spiral unit being anchored to the insert, for example, via the arch 145 and aperture 147 system similarly or the same as in connector 10, and another portion of the spiral unit, for example, spiral end(s) 144 being anchored to the housing end-part 165 at anchor 162. During and after rotation of housing parts 160, 165 relative to each other to tighten the spiral unit 140, the insert-housing ratchet system 160R and the inter-housing-parts ratchet mechanism 165R prevent rotation in the opposite, spiral-loosening relative direction. To accomplish this, the two ratchet mechanisms 160R, 165R are oriented so that their teeth are "pointed" in opposite directions. As shown in FIGS. 14-18, there may be three housing parts in connector 100, that is, the housing collar 160, and two end-parts 165 that are at each end of the collar 160, each of the end-parts 165 featuring an inter-housing-parts ratchet mechanism 165R as described above. In such embodiments, the user may grasp or control either or both of the end-parts 165, plus the collar 160, to accomplish the above-described tightening by relative rotation.

Unlatching elements/process similar or the same as that in connector 10 may be used in connector 100. For example, the unlatching system may provide lever 184 for controlling a cable that releases/disconnects the insert-housing ratchet system 160R to allow the spiral unit 140 to relax and loosen to its larger-diameter condition for releasing the conduits. The unlatching system of connector 10 and connector 100 will be described later in this document.

Figure 21:
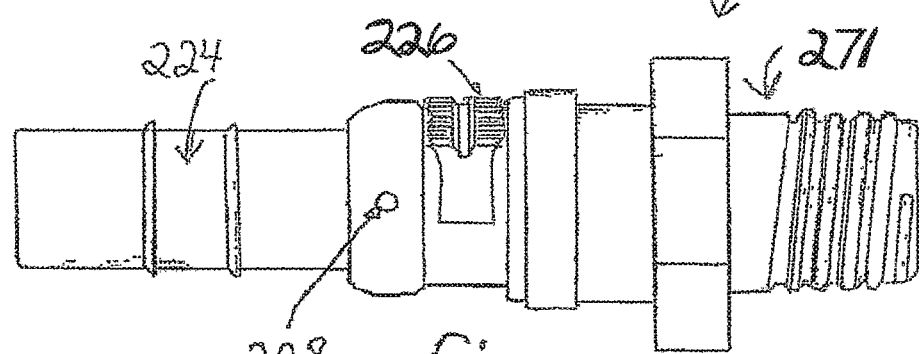
FIG. 21 is a side view of an insert and ratchet arm/clip combination similar to that of FIG. 19, wherein one end of the insert is adapted to cooperate with the spiral unit shown in FIGS. 19 and 20 to connect to a first conduit, and the other end of the insert comprises a coupler, such as a conduit or hose coupler, in this case, a threaded male end of a coupler embodiment for threadably attaching to a second conduit.
Figure 22:
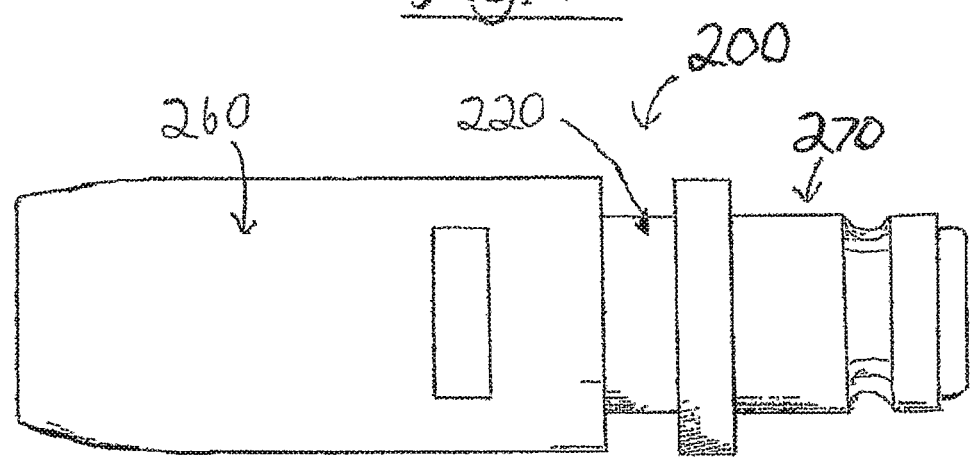
FIG. 22 is a side view of the assembled connector of FIG. 19, wherein the housing and spiral unit of FIG. 20 are assembled with the insert of FIG. 19, which has a first end the same as the first end of FIG. 21 that is adapted to cooperate with the spiral unit of FIGS. 19 and 20, and a second end that comprises an alternative male coupler (compared to FIG. 21).

Additional alternative embodiments are shown in FIGS. 19-22. Connector 200 uses an alternative insert 220, and an alternative spiral unit 240 that coils around only one end 224 of the insert 220 that is similar or the same as the ends 24 shown for connector 10. The spiral unit 240 is tightened by relative rotation of the insert 220 and the housing 260. An alternative spiral anchor system is used, in which one end of the spiral unit 240 (for example, two spiral strip ends 244 of a double-spiral of coils 246) are anchored to the inner surface of the housing 260, and an opposite end of the spiral unit 240 (for example, two spiral strip opposite ends 244 of the double spiral) is anchored to the insert 220, both at locations that are to the left in FIGS. 19-22 of the ratchet clip 226. The anchors may comprise peg anchors 262, 228 that that are fixed to, or integral with, the housing and to the insert, respectively, and that extend radially-inward from the housing inner surface 261 and radially-outward from the insert outer surface 229, respectively, to be received securely inside holes 248 of the spiral unit ends 244. At an end of the insert 220 opposite the spiral unit 240, the insert 240 comprises a conduit-coupler 270, which is exemplary of a portion of a conventional conduit/hose coupler. Conventional conduit/hose couplers of various types may be provided integrally or connected to said opposite end of the insert, as will be understood by those in the fields of the hydraulics and pneumatics. For example, insert 221 of FIG. 21 illustrates an alternative conduit-coupler 271 that is a male threaded portion of an alternative conventional conduit/hose coupler. Therefore, conduit/hose couplers other than the two drawn in FIGS. 19, 21 and 22 may be provided on insert 220, for example, and certain embodiments of the conduit/hose couplers do not comprise a spiral or a spring.

To operate connector 200, a user will slide/push a conduit (not shown in FIGS. 19-22, but understood from earlier drawings) onto the insert end 224 and then rotate the housing 260 relative to the insert 220, in the relative direction allowed by the ratchet system comprising ratchet clip 226 teeth engaging the ratchet teeth 264 inside the housing. Similarly to the tightening steps discussed above for connectors 10, 100, the spiral unit 240 will tighten around the conduit to capture and retain the conduit in a liquid-sealed condition with the insert and therefore its inner-passageway. To accomplish the relative rotation, a user may grasp the housing 260 in one hand, or with a first tool, and may grasp the coupler 270 with the other hand or a second tool to thereby rotate the housing and insert relative to each other.

Alternatively, if the conduit having been pushed/slid onto the insert end 224 of insert 240 is tight enough on the insert end 244, a user may grasp the conduit and the housing 260 and rotate the housing relative to the conduit-and-insert combination to tighten the spiral unit 240. This alternative method may be understood to be similar to a tightening method described above for connector 10, as the insert end 224 of connector 200 is not accessible with the conduit pushed over the insert 224, like the insert ends 24 of connector 10 are not accessible with conduits C1, C2 pushed over them.

An unlatching system similar or the same as that in connectors 10 and 100 may be used in connector 200. For example, the unlatching system may provide lever 284 for controlling a cable that releases/disconnects the ratchet clip 226 from the housing, to allow the spiral unit 240 to relax and loosen to its larger-diameter condition for releasing the conduit from insert end 224.

FIGS. 23A, 23B and 24-28 schematically illustrate an embodiment of the latching system 80 that may be used in connector 10, 100, 200. In the end cross-sections of FIGS. 23A and B, using the reference numbers from connector 10 for simplicity, one may see the lever 84 in a latched position, lying in a recess/aperture in the outer surface of the housing collar 60 and pivotal at pivot axle 85 relative to the collar 60. Upon pivoting the lever 84, the cable 82, which is attached to the lever at a location distal of the pivot axle 85, is pulled away from its connector-in-use location in/near the relatively smooth ring 61' of the inner surface of the housing collar 60 between the rings of teeth 64. Therefore, as illustrated in FIG. 23B, the cable moves from its connector-in-use shape that may be about the size and circular-shape of the housing inner surface, to a shape that effectively reduces the diameter of the circle formed by the cable 82. This pulling away of the cable 82 from the housing, toward the insert (not shown in FIGS. 23A and B but understood from the other drawings) will serve to pull the ratchet clip(s) 26 also away from the housing toward the insert. Specifically, this movement of the cable 82 toward the insert will pull the ratchet clip teeth 54 away from the housing ratchet teeth 64 to disengage the ratchet-based latching system. Thus, upon this movement of the cable, the insert is unlatched from the housing to allow relative movement of the insert and housing in the "previously-not-allowed" direction, so the spiral unit anchored to both the insert and the housing is in effect also unlatched to relax to the loosened condition. Thus, by operating the unlatching system, the conduit(s) may be removal of conduit(s) when desired. In FIGS. 24-26 one may see enlargements of the lever 84 and the cable 82.

Figure 27A:
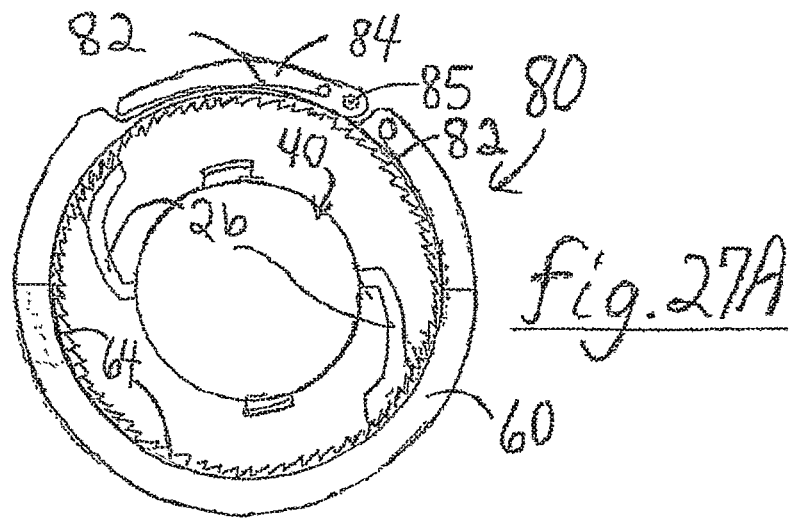
FIG. 27A and FIG. 27B are a cross-sectional, schematic end views of an embodiment of the unlatching system of FIGS. 1-22 and of the lever and strap system of FIGS. 23A, 23B, and 24-26, wherein two diametrically-opposed ratchet arms/clips are shown installed on the insert, and the cooperation of the cable with the ratchet arms/clips is portrayed, as follows.
Figure 27B:
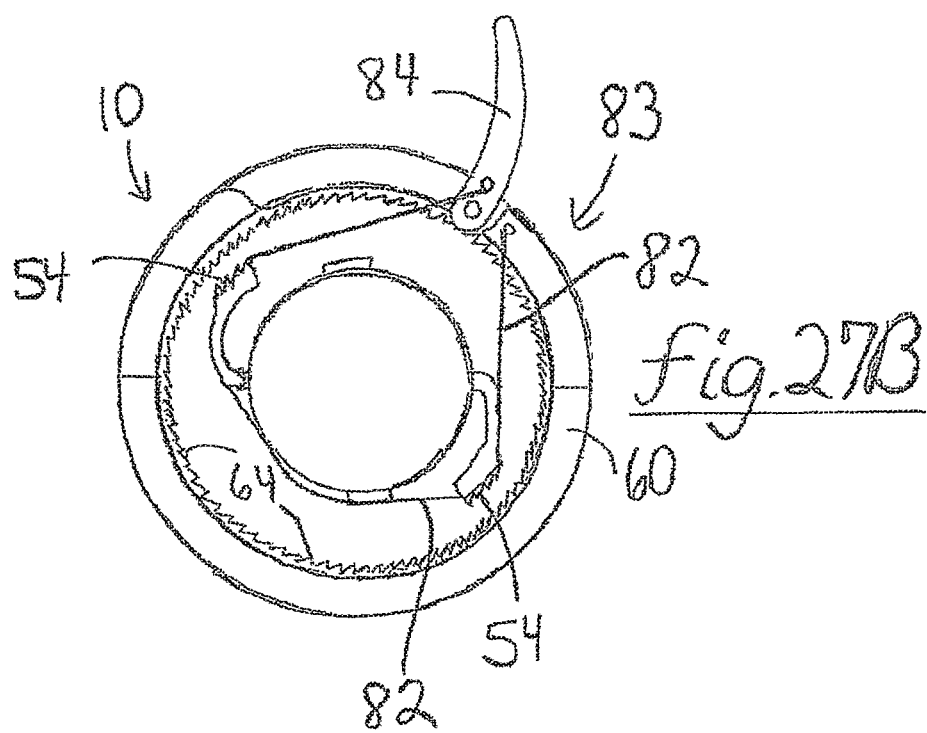

In FIGS. 27A and B, one may see schematic drawings similar to FIGS. 23A and B, respectively, but with two ratchet clips 26 diametrically opposed on the insert 20 and interacting with cable 82 controlled by lever 84. FIG. 27A portrays the latching system in the latched condition with the ratchet teeth 54 engaged with the housing teeth, and FIG. 27B portrays the latching system in the unlatched condition wherein the ratchet teeth are disengaged from the housing teeth. While not visible in FIGS. 27A and B, it is noteworthy that the cable is preferably placed to extend/circle at a location relative to the housing and the insert that places it in/adjacent to the smooth ring 61' of the housing inner surface between the rings of teeth 64 and also in/adjacent to the groove 27 (FIGS. 4, 6, 9 and 13) between the two rows of teeth 54 of the clip 26. Therefore, when the cable 82 is pulled into the position shown in FIG. 27B, the cable 82 tends to lie in the groove 27 of the ratchet clips 26 to reliably and smoothly pull the clips 26 inward from the housing teeth 64, utilizing the preferred flexibility of the clips 26. In the unlatched condition, the ratchet clips and their teeth being pulled away from the housing, serves to unlatch the insert from the housing for relative rotation of the insert an the housing in a relative direction that will loosen the spiral(s) of the connector. Certain embodiments of the unlatching system are reversible, and the connector may be reused with the same conduit(s) or different conduit(s) as desired.

The materials of the pieces-parts of the preferred connectors may vary, for example, ranging from light weight plastics and nylon, to stainless steel and steel for certain high-pressure, heavy duty versions. Many materials, and future materials having greater UV protection, may be used in certain embodiments, depending upon the fluid, application, pressure, and environment of the use. Also, the pitch and width of the spirals may vary in certain embodiments, based on upon the fluid, application, pressure, and environment of the use. For example, low-pressure versions of the connector will be able to maintain city-wide water pressures, and residential and semi-commercial water pressures. For example, heavy duty versions of the connector will be able to handle high pressure hydraulic and pneumatic lines like the ones used on tractors, trucks, busses etc.

In certain embodiments, neither the spiral unit, nor the insert, nor any part of the connector is required to be electrically-conductive, as the preferred connector embodiments are for fluid flow rather than electricity flow. Preferably, there are no wires or other elements (except fluid) inside the hollow insert inner-passageway, and preferably the only elements inside the spiral unit are one or more fluid conduits and the rigid insert. The spiral unit, the insert, and the other pieces-parts of the connector, may be made, in certain embodiments, entirely of non-electrically-conductive materials. Stainless steel, or other non-corrosive metals may be used in the conductor in certain embodiments, in order to prevent corrosion caused by certain fluids, but not in order to conduct electricity.

It should be noted that, where a particular feature/aspect, a particular embodiment, and/or particular step(s) of operation are disclosed herein in the context of one embodiment, that feature/aspect, embodiment, and/or operation step can also be used, to the extent appropriate and effective, in the other embodiments, and in the invention generally.

Although this disclosed technology has been described above with reference to particular means, materials and embodiments, it is to be understood that the disclosed technology and the invention are not limited to these disclosed particulars, but extend instead to all equivalents within the broad scope of the following claims.

The invention claimed is:

1. A connection system for a fluid conduit, the system comprising:
   a connector comprising:
   an elongated, hollow connector housing;
   an elongated, hollow connector insert received inside and coaxial with the housing, the insert having an inner passageway;
   an elongated spiral received between, and coaxial with, the housing and the insert, the spiral unit having a loosened configuration having a relaxed diameter; and
   the system further comprising a fluid conduit comprising an open end of the conduit having a circumference and a length, the open end of the conduit being inserted into the connector, when the spiral is in the loosened configuration, between the spiral and the insert, so that the open end of the conduit is around a portion of the insert and a hollow interior of the conduit is coaxial with the inner passageway;
   wherein the spiral has a first portion anchored to the insert and a second portion anchored to the housing, and wherein rotation of the housing relative to the insert tightens the spiral from the loosened configuration to a tightened configuration having a tightened diameter that is smaller than the relaxed diameter, so that the spiral tightens around the open end of the conduit all around the circumference to fluid-seal the conduit in fluid communication with the inner passageway.

2. The connector system of claim 1, wherein the insert is rigid so that tightening of the spiral around the open end of the conduit does not deform and does not collapse said portion of the insert.

3. The connector system of claim 1, wherein the portion of the insert is a first end of the insert, the conduit is a first conduit, the insert comprises a second end opposite the first end, and the system further comprises a second conduit having a second open end having a circumference and a length, the second open end being inserted into the connector between the spiral unit and the insert, when the spiral is in the loosened configuration, so that the second open end is around a second portion of the insert and a hollow interior of the second conduit is coaxial with the inner passageway;
wherein, when rotation of the housing relative to the insert tightens the spiral from the loosened configuration to a tightened configuration, the spiral tightens around the second open end all around the circumference of the second open end to fluid seal the second conduit in fluid communication with the inner passageway and in fluid communication with the first conduit.

4. The connector system as in claim 1, wherein the housing comprises a central collar to which said second portion is anchored.

5. The connector system as in claim 1, wherein the housing comprises a central collar and a housing end-part, wherein the second portion of the spiral is anchored to the housing end-part, and wherein rotation of the housing end-part relative to the insert tightens the spiral from the loosened configuration to the tightened configuration.

6. The connector system as in claim 5, wherein the central collar is latched to the insert, so so that rotation of the housing end-part relative to the insert comprises rotation of the housing end-part relative to the central collar.

7. The connector system as in claim 1, wherein the portion of the insert is a first end of the insert, the conduit is a first conduit, the insert comprises a second end opposite the first end, wherein the second end of the insert comprises a conduit coupler for attachment to a second conduit.

8. The connector system as in claim 7, wherein the conduit coupler does not comprise a spiral.

9. The connector system as in claim 1, wherein the connector comprises an insert-housing ratchet mechanism that is adapted to control relative rotation of the insert and the housing.

10. The connector system as in claim 9, wherein the insert-housing ratchet mechanism rotation allows rotation of the housing relative to the insert in a first direction, to tighten the spiral, and prevents rotation of the housing relative to the insert in a second direction that is opposite the first direction to retain the spiral in the tightened configuration.

11. The connector system as in claim 9, wherein the connector comprises an unlatching system that disengages the insert-housing ratchet mechanism for allowing the spiral in the tightened configuration to return to the loosened configuration by allowing the housing to rotate in the second direction relative to the insert.

12. The connector system as in claim 5, wherein the connector comprises an inter-housing-parts ratchet mechanism between the central collar and the housing end-part to control relative rotation of the housing end-part relative to the central collar.

13. The connector system as in claim 12, wherein the connector further comprises an insert-housing ratchet mechanism adapted to control rotation of the central collar relative to the insert, and the connector further comprising an unlatching system that disengages the insert-housing ratchet mechanism for allowing the spiral in the tightened configuration to return to the loosened configuration by allowing the central collar to rotate relative to the insert.

14. The connector system as in claim 12, wherein the housing further comprises an additional housing end-part at an opposite end of the connector relative to said housing end-part, and the connector comprises an additional inter-housing-parts ratchet mechanism between the central collar and the additional housing end-part to control relative rotation of the additional housing end-part relative to the central collar.

15. The connector system as in claim 11, wherein the unlatching system comprises a cable adapted to disengage said insert-housing ratchet mechanism.

16. The connector system as in claim 15, wherein the cable is actuated to disengage the insert-housing ratchet mechanism by a level extending through the housing.

17. The connector system as in claim 13, wherein the unlatching system comprises a cable adapted to disengage said insert-housing ratchet mechanism.

18. The connector system as in claim 17, wherein the cable is actuated to disengage the insert-housing ratchet mechanism by a level extending through the central collar.

19. The connector system of claim 1, wherein neither the insert nor the spiral are electrically-conductive.

20. The connector system of claim 1, wherein only fluid is received inside the insert.

21. The connector system of claim 1, wherein no electrically conductive member is received inside the spiral.

22. A connector for a fluid conduit, the connector comprising:
    an elongated, hollow connector housing;
    an elongated, hollow connector insert received inside and coaxial with the housing, the insert having an inner passageway;
    an elongated spiral received between, and coaxial with, the housing and the insert, the spiral unit having a loosened configuration having a relaxed diameter; and
    wherein the loosened configuration adapts the connector to receive an open end of a fluid conduit, between the spiral and the insert, so that the open end of the conduit is around a portion of the insert and a hollow interior of the conduit is coaxial with the inner passageway;
    wherein the spiral has a first portion anchored to the insert and a second portion anchored to the housing, and wherein rotation of the housing relative to the insert tightens the spiral from the loosened configuration to a tightened configuration having a tightened diameter that is smaller than the relaxed diameter, so that the spiral is adapted to tighten around the open end of the conduit all around a circumference of the open end to fluid-seal the conduit in fluid communication with the inner passageway.

* * * * *